United States Patent [19]

Martinez

[11] Patent Number: 4,802,549
[45] Date of Patent: Feb. 7, 1989

[54] CENTRAL ROTATING TERMINAL FOR VEHICLES

[75] Inventor: Mario J. Martinez, Elgin, Ill.

[73] Assignee: Elgin Sweeper Company, Elgin, Ill.

[21] Appl. No.: 79,809

[22] Filed: Jul. 30, 1987

[51] Int. Cl.4 .......................... B60K 26/00; B62D 1/22
[52] U.S. Cl. ..................................... 180/322; 180/323; 180/326
[58] Field of Search ...................... 180/89.13, 90, 322, 180/323, 326, 334; 280/775

[56] References Cited

U.S. PATENT DOCUMENTS

| | | | |
|---|---|---|---|
| 2,976,947 | 3/1961 | Cruthis et al. | 180/90 |
| 3,088,537 | 5/1963 | Tourneau | 180/328 |
| 3,194,338 | 7/1965 | Rutman et al. | 180/90 |
| 3,398,984 | 8/1986 | Ajero | 296/1 R |
| 3,620,498 | 11/1971 | Tunkl | 248/278 |
| 3,799,569 | 3/1974 | Baker | 280/775 |
| 4,126,202 | 11/1978 | Hern | 180/89.12 |
| 4,155,309 | 5/1979 | Ames et al. | 105/456 |
| 4,299,407 | 11/1981 | Simson | 280/775 |
| 4,372,410 | 2/1983 | Loken et al. | 180/89.12 |
| 4,471,848 | 9/1984 | Skytoen | 180/90 |
| 4,505,356 | 3/1985 | Baier et al. | 180/322 |
| 4,505,510 | 3/1985 | Lepoix | 296/70 |
| 4,538,478 | 9/1985 | Sato et al. | 280/775 |
| 4,615,502 | 10/1986 | McLaughlin | 248/176 |

FOREIGN PATENT DOCUMENTS 1255756  1/1961  France ................. 180/323

Primary Examiner—Kenneth R. Rice
Attorney, Agent, or Firm—Charles F. Pigott, Jr.; Garrettson Ellis

[57] ABSTRACT

A vehicle has first and second drivers' seats and a control console, the control console carrying a plurality of individual controls and display means. The drivers' seats are in side-by-side relation. By this invention, a pivot carries the control console to permit the console to pivot between at least a first position facing the first driver's seat and a second position facing the second driver's seat. Thus, two drivers may operate the vehicle from the same control console in alternating manner. Typically a, releasable lock provides retention of the control console in either of the two positions described above, and also in an intermediate rotating position in which the control console faces between the two seats. Also, cable may communicate with the control console, the cable extending through the pivot for communication with the rest of the vehicle.

17 Claims, 3 Drawing Sheets

CENTRAL ROTATING TERMINAL FOR VEHICLES

BACKGROUND OF THE INVENTION

In many large, special purpose vehicles of the present day such as street sweepers, but not limited thereto, two operators' seats may be present, with each seat facing a separate instrument panel incorporating gauges to monitor, for example, the main truck engine of the sweeper, the road speed, and sweeper auxiliary functions. A considerable expense is involved in providing two separate control terminals or instrument panels for such a vehicle, but, in the operation of many vehicles the presence of two full operating stations for the vehicle is deemed necessary.

In accordance with this invention, a system is provided in which one of the control terminals can be eliminated, for a significant cost saving, while at the same time two operators can sit side by side and can operate the apparatus in any desired sequential, alternating manner.

In Baier et al., U.S. Pat. No. 4,505,356, a vehicle is disclosed in which a pair of operating seats are provided, with a pivoting control stick positioned between the two pivoting seats for the operators. In contrast, by this invention, a full instrument panel or control terminal incorporating a plurality of gauges and controls is positioned to alternatingly present itself to a pair of operators sitting in side-by-side relation, with the instrument and control panel of this invention being positioned in front of the operating sets rather than directly to the side thereof, for better opportunity for the operator to observe the forward progress of the vehicle.

DESCRIPTION OF THE INVENTION

In accordance with this invention, the vehicle has first and second drivers' seats and a control console, with the drivers' seats being in side-by-side relation. In accordance with this invention, pivot means carry the control console to permit the console to pivot between at least a first position facing the first driver's seat and a second position facing the second driver's seat. Thus, the vehicle can be operated by either driver by simple rotation of the control console to the appropriate position facing the seat occupied by the one that is doing the driving at that moment.

Additionally, the control console may be pivotable to a third position between the first and second positions, so that two operators at once may view the control console, for purposes of instruction and the like.

Additionally, releasable locking means may provide retention of the control console in any of the positions. Typically, electrical cable (although optical cable and the like may also be used as desired) communicates with the control console, extending from the console to the various controlled and monitored portions of the vehicle. The cable may extend through the pivot means for communication to the rest of the vehicle, to facilitate easy pivoting of the console without any interference with the integrity of the cable.

The pivot means may comprise a rotatable plate member attached to the control console, and a ring member carried in stationary manner in the vehicle. The plate member rests on, and is slidably rotatable with respect to, the ring member. The ring member may comprise upper and lower portions which enclose between them an inner portion of the plate member, the ring member being typically made of a low friction plastic material to facilitate rotational movement of the plate member within the ring member.

A stationary locking plate may be carried on the vehicle, the locking plate defining a periphery having a plurality of spaced notches. The rotatable plate member may then carry a spring-biased plunger to project into one of said notches in any of the pivoting positions present, to releasably lock the console into any one of such positions. The typically-present positions include two positions where the console respectively faces either one or the other of the side-by-side seats. Additionally, at least one central position may be provided into which the control console may be locked while facing a direction between the two seats, for use by both operators.

The spring-biased plunger described above may carry handle means for easy manual locking, unlocking, and pivoting for the console. Additionally, one of the rotatable plate member and locking plate may carry cirumferential slot means. In this circumstance, the other of the rotatable plate member and locking plate carries pin means extending into the circumferential slot means. As a result of this, the range of pivoting of the console is limited by the length of the slot means so that the control console cannot rotate to a degree significantly beyond the desired two extreme rotating positions, which are typically the positions which respectively face the two seats.

Thus, a vehicle such as a street sweeper may carry a single central rotating terminal or control panel for use and monitoring by two operators who sit in side-by-side relation. As stated above, the single instrument panel may incorporate gauges to monitor the main truck engine, the road speed, and sweeper auxiliary engine functions of any known type of conventional sweeper. Gauges and switches on the rotating control console, terminal, or panel may be illuminated, and also may have graphics for control and gauge displays, being powered by the cable which passes through the pivot.

The invention of this application may be also used in other vehicles, for example large combines and planting machines which have room for two operators, road grading machines, paving machines, boats, aircraft, and any other desired vehicle.

DESCRIPTION OF SPECIFIC EMBODIMENT

Figure 1:
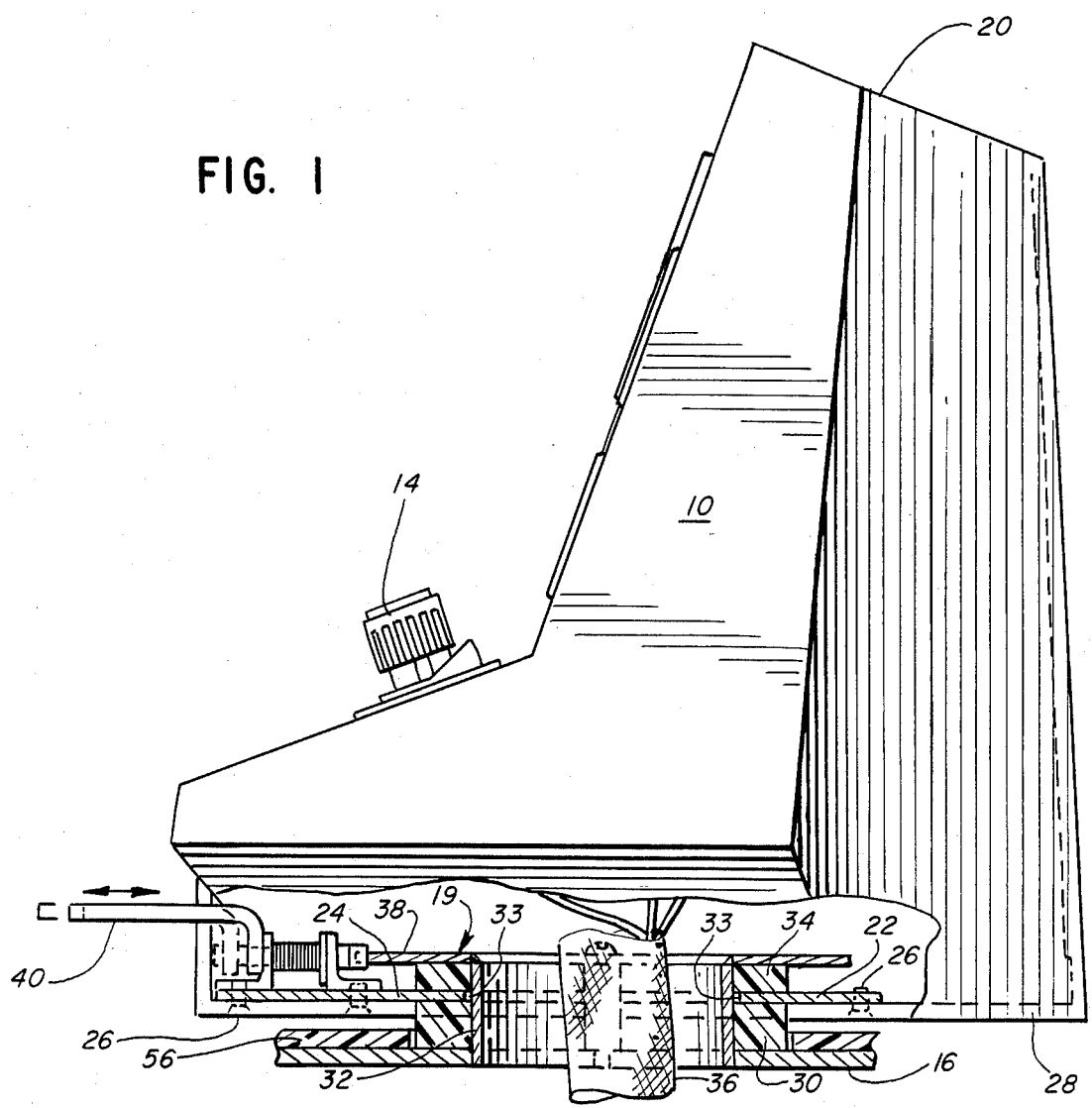
FIG. 1 is an elevational view, taken partly in section, showing the control console of this invention emplace in a vehicle.

Referring to the drawings, a control console 10 is shown having various data display members such as gauges 12, as well as switches and other controls 14, for operation of all or part of the vehicle in which control console 10 is carried. Control console 10 is mounted on a wall 16 which may constitute part of the engine housing (for example) of the vehicle, between and forward of a pair of drivers' seats 18 which are positioned in side-by-side relation, as shown in FIG. 2.

Figure 2:
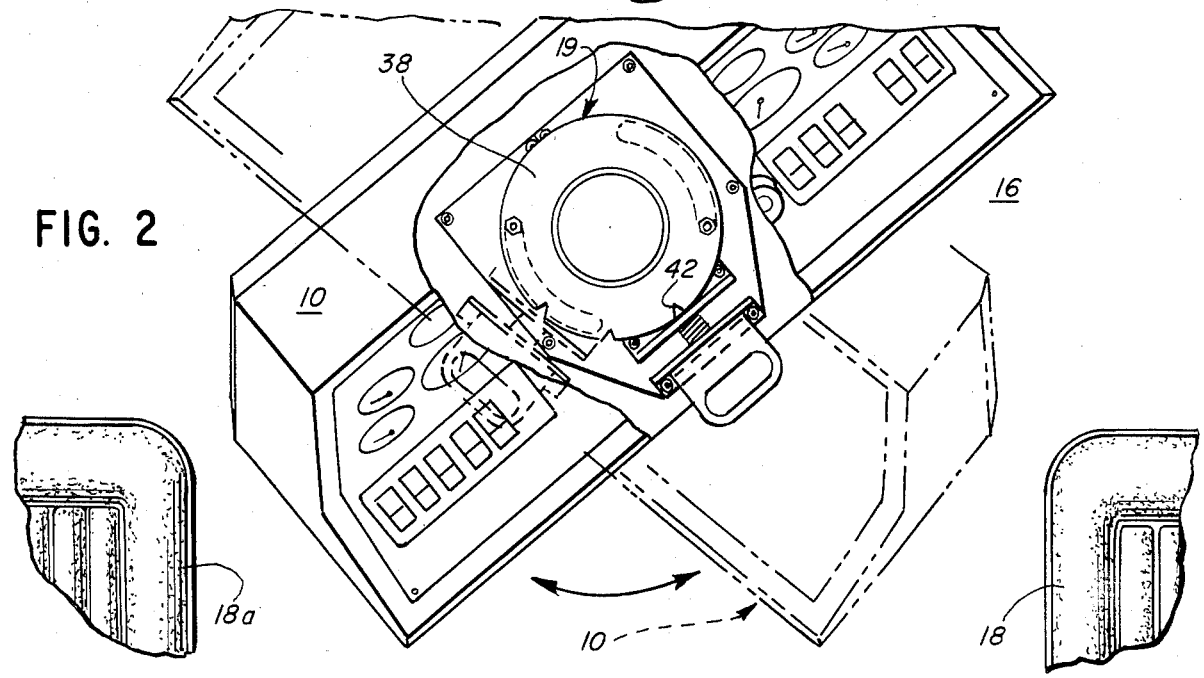
FIG. 2 is a plan view, with portions broken away, of the control console of FIG. 1 showing its positioning and rotational relationship with a pair of seats in a vehicle in side-by-side relation.
Figure 3:
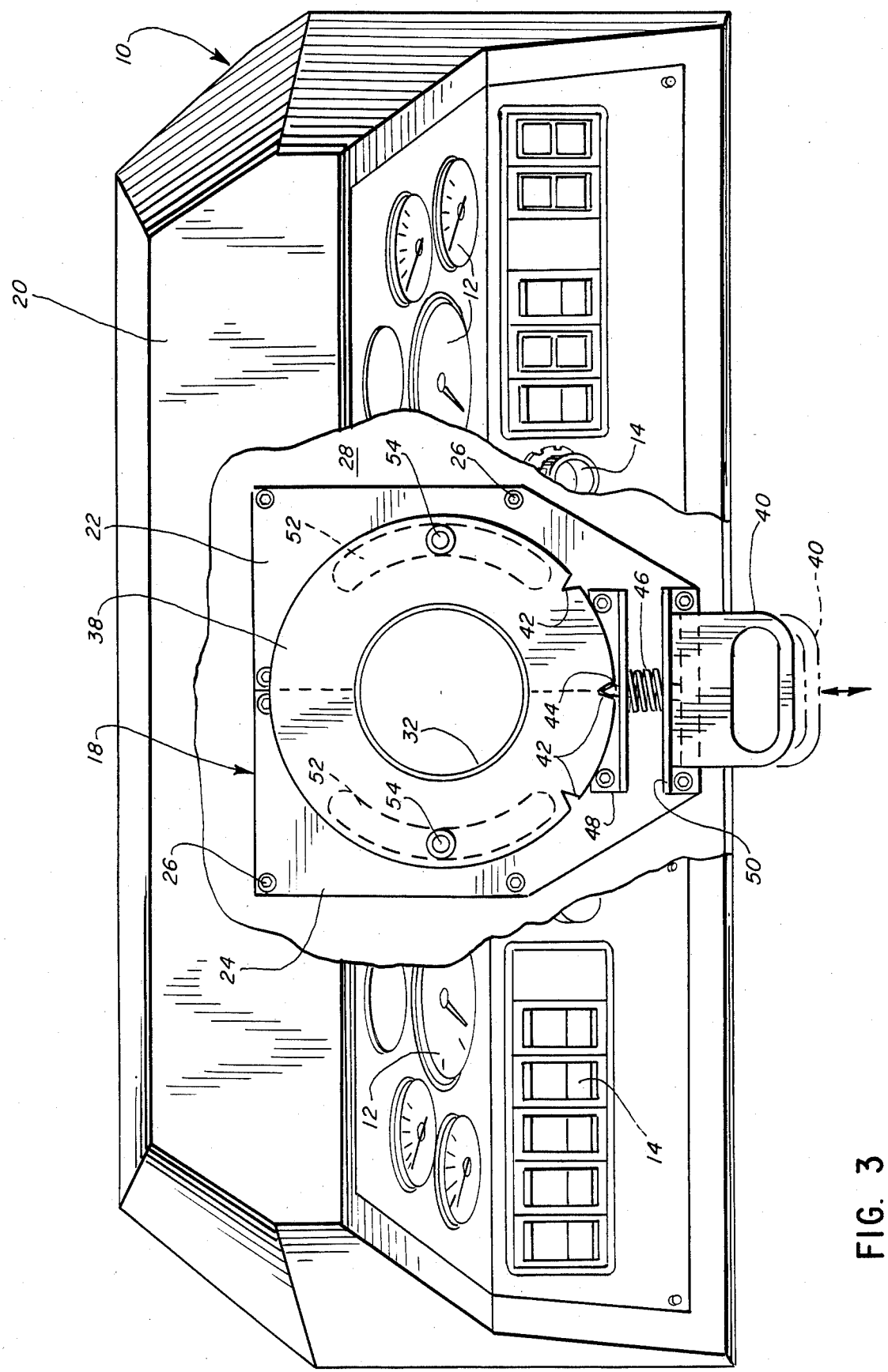
FIG. 3 is an enlarged plan view of the control console of FIG. 2 with portions broken away.

In accordance with this invention, pivot means 19 is provided, carrying control console 10 to permit the console to pivot between at least a first position facing first driver's seat 18 as shown in full lines in FIG. 2, and a second position facing the second driver's seat 18a, as shown in phantom lines. Additionally, control console 10 is pivotable to a third position as shown in FIG. 3, the third position being between the first and second pivoting positions, so that control console can be viewed by occupants of both seats 18 and 18a. In FIG. 3, top surface 20 of control console 10 and other portions have been broken away to permit viewing of pivot means 18 positioned underneath control console 10.

Pivot means 19 includes a rotatable plate member, comprising in this embodiment a pair of plate member halves 22, 24 which are connected by bolts 26 to the bottom wall 28 of the casing of control console 10, to be immovably carried thereby.

Ring member 30, typically made of a low friction plastic material such as nylon, is carried about tubular sleeve 32. Ring member 30 can be seen to be positioned below rotatable plate member portions 22, 24, with plate member portions 22, 24 resting thereon in a rotatably slidable relation. An upper ring member 34 may also be provided for support, being carried about sleeve 32 and attached to ring member 30 by annular web 33. Sleeve 32, in turn, projects through an aperture in bottom wall 28 and typically wall 16 of the vehicle as well, to provide an access route for control cable system 36 to and from the interior of control console 10 through sleeve 32. Control cable 36 can thus communicate with the various functional stations of control console 10, passing through sleeve 32 and then dividing to send individual wires out to the various portions of the vehicle to be controlled or monitored.

Stationary locking plate 38 is also provided, it being shown as carried on an end of sleeve 32.

Rotatable plate member portons 22, 24 are typically formed into halves for ease of assembly of the pivot means of this invention. A manually graspable handle 40 is attached to rotatable plate member portions 22, 24, with the result that control console 10 may be rotated side by side between the respective pivoting positions by rotational movement of handle 40. In this action, rotatable plate member portions 22, 24 rotate in sliding manner between ring members 30, 34, which, along with locking plate 38 and sleeve 32, remain stationary with the vehicle wall. Cable 36 may move appropriately within the confines of the interior of sleeve 32 without binding or other ill effect as control console 10 rotates between the respective positions facing seat 18 and seat 18a.

A system for releasable locking of control console 10 into one of the desired positons is provided in the following manner. Stationary locking plate 38 carries a plurality of peripheral notches 42, as shown in FIG. 3. Also, handle 40 is attached to a plunger member 44, which is proportioned to fit respectively into notches 42. Plunger 44 and handle 40 are controlled by a tension spring 46 which biases plunger 44 into its advanced position for engaging one of notches 42, which prevents rotation of plate members 22, 24 and control console 10 until handle 40 is pulled to remove plunger 44 from engagement with a notch 42.

Tension spring 46 may be attached to a pair of brackets 48, 50, each of which are attached to plate member portions 22, 24. Thus, to move console 10 from one position to another, one pulls handle 40 outwardly as indicated in phantom lines in FIG. 3, which causes the retraction of plunger 44. Then, console 10 and plate member portions 22, 24 may be rotated relative to the rest of the vehicle from one pivoting position to another as may be desired. When plunger 44 is aligned with one of notches 42, plunger 44 will automatically snap into engagement, driven by spring 46, unless one is manually exerting manual retraction force on handle 40. Thus, the embodiment shown in this application may be releasably locked into any of three different positions; two of which positons cause console 10 to face either seat 18 or seat 18a, or a third position in which console 10 faces a direction which is between the two seats, so that both occupants can easily view and control the console.

Figure 4:
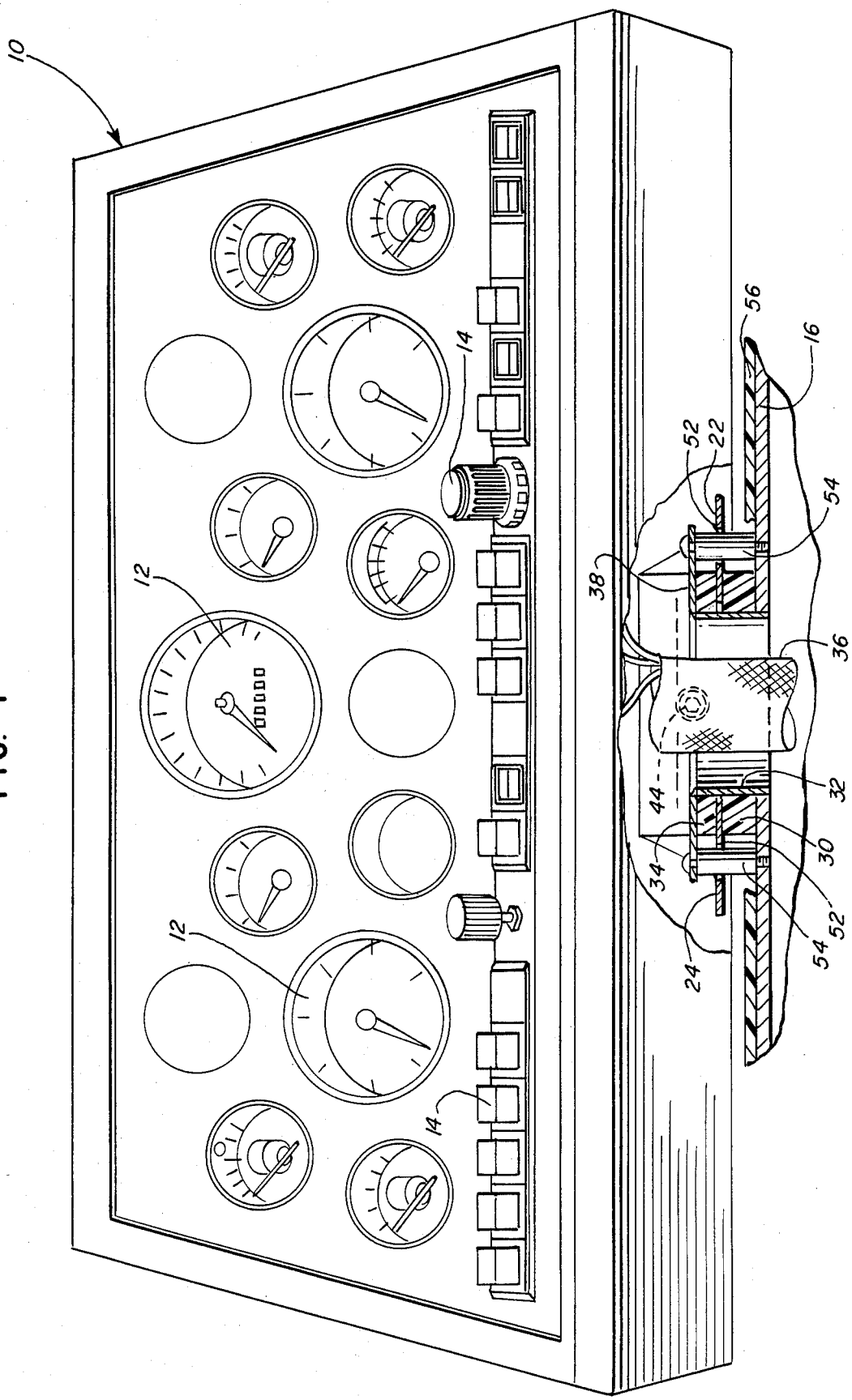
FIG. 4 is an enlarged elevational view of the control console shown in the previous drawings with portions broken away.

Additionally, each of plate member portions 22, 24 carry circumferential slots 52. Stationary locking plate 38 is connected to one end of a pair of projecting pins 54, which may be attached at their other ends as shown in FIG. 4 to wall 16 of the vehicle. Accordingly, as control console 10 and plate members 22, 24 are rotated, circumferential slots 52 slide in rotary manner along pins 54. Slots 52 will be of sufficient length to permit rotational movement of control console 10 into the desired positions, particularly those positions in which plunger 44 can respectively engage any of notches 42. However, the amount of rotational movement of control console 10 is precisely limited by the relationship between pins 54 and slots 52, so that console 10 will not rotate to such an extent, for example, that cable 36 is damaged.

Sound insulating coating 56 may be provided on wall 16 of the vehicle to mask, for example, engine noise.

Accordingly, by this invention, a single control console may be used to serve a vehicle which has a pair of operating seats in side-by-side relation, with the control console being positioned generally in front of the seats. By this, significant manufacturing savings may be achieved, while at the same time the console is easily and conveniently displayed to and used by operators in either of the seats.

The above has been offered for illustrative purposes only, and is not intended to limit the scope of the invention of this application, which is as defined in the claims below.

That which is claimed is:

1. In a vehicle having first and second driver's seats and a control console, said driver's seats being in side-by-side relation, the improvement comprising, in combination:
    pivot means carrying said control console to permit said console to pivot between at least a first positon facing said first driver's seat and a second position facing said second driver's seat, said pivot means comprising a rotatable plate member attached to said control console and a ring member carried in stationary manner in said vehicle, said plate member resting on and being slidably rotatable with respect to said ring member.

2. The vehicle of claim 1 in which said control console is pivotable to a third positon between said first and second positions.

3. The vehicle of claim 2 in which releasable locking means provides retention of said control console in any of said positions.

4. The vehicle of claim 1 in which electrical cable means communicates with said control console, said cable means extending through said pivot means for communication with the rest of the vehicle.

5. The vehicle of claim 1 in which said ring member comprises upper and lower portions which enclose between them an inner portion of said plate member.

6. The vehicle of claim 1 in which said ring member is made of a low friction plastic material.

7. The vehicle of claim 1 including a stationary locking plate defining a periphery having a plurality of spaced notches, said rotatable plate member carrying a spring-biased plunger to project into one of said notches in either of said pivoting positions, to releasably lock said console in either of said positions.

8. The vehicle of claim 7 in which said ring member is carried about the outer surface of a support sleeve.

9. The vehicle of claim 7 in which said control console is pivotable to a third position between said first and second positions, said locking plate defining a notch to permit releasable locking of said console in the third position.

10. The vehicle of claim 7 in which said spring-biased plunger carries handle means for manual locking, unlocking, and pivoting of said console.

11. The vehicle of claim 7 in which one of said rotatable plate and locking plate carries circumferential slot means, and the other of said rotatable plate and locking plate carries pin means extending into said circumferential slot means, whereby the range of pivoting of said console is limited by the length of said slot means.

12. In a vehicle having first and second driver's seats and a control console, said driver's seats being in side-by-side relation, the improvement comprising, in combination:
  pivot means carrying said control console to permit said console to pivot at least to a first position facing said first driver's seat and a second position facing said second driver's seat, and releasable locking means for providing retention of said control console in any of said positions, and also including cable means communicating with said control console, said cable means extending through said pivot means for communication with the rest of the vehicle, said pivot means comprising a rotatable plate member attached to said control console, and a ring member carried in a stationary manner in said vehicle, said plate member resting on and being slidably rotatable with respect to said ring member said ring member comprising upper and lower portions of low friction plastic material which enclose between them an inner portion of said plate member.

13. The vehicle of claim 12 in which said control console is pivotable to a third position between said first and second positions, and releasably lockable in said third position.

14. The vehicle of claim 12 including a stationary locking plate defining a periphery having a plurality of spaced notches, said rotatable plate member carrying a spring-biased plunger to project into one of said notches in any of said pivoting positions, to releasably lock said console in any of said positions.

15. The vehicle of claim 14 in which said spring-biased plunger carries handle means for manual locking, unlocking, and pivoting of said console.

16. The vehicle of claim 15 in which one of said rotatable plate and locking plate carries circumferential slot means, and the other of said rotatable plate and locking plate carries pin means extending into said circumferential slot means, whereby the range of pivoting of said console is limited by the length of said slot means.

17. The vehicle of claim 16 in which said ring member is carried about the outer surface of a support sleeve.

* * * * *